US008634722B2

(12) United States Patent
Walewski

(10) Patent No.: US 8,634,722 B2
(45) Date of Patent: Jan. 21, 2014

(54) NON-CONTACT TRANSMISSION OF OPTICAL SIGNALS

(75) Inventor: Joachim Walewski, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 781 days.

(21) Appl. No.: 12/434,980

(22) Filed: May 4, 2009

(65) Prior Publication Data

US 2009/0279899 A1 Nov. 12, 2009

(30) Foreign Application Priority Data

May 6, 2008 (DE) .......................... 10 2008 022 217

(51) Int. Cl.
*H04B 10/00* (2013.01)

(52) U.S. Cl.
USPC .......................................... 398/141; 398/142

(58) Field of Classification Search
USPC ................................................... 398/141, 142
See application file for complete search history.

(56) References Cited

U.S. PATENT DOCUMENTS

| 4,259,584 | A | | 3/1981 | Krumme |
| 6,043,916 | A | | 3/2000 | Poisel et al. |
| 6,167,181 | A | * | 12/2000 | Fukaishi ....................... 385/123 |
| 2003/0138013 | A1 | * | 7/2003 | Kasamatsu ..................... 372/39 |
| 2007/0010731 | A1 | | 1/2007 | Mistretta |
| 2007/0025509 | A1 | | 2/2007 | Pang et al. |
| 2007/0041086 | A1 | | 2/2007 | Ruschin et al. |
| 2008/0145062 | A1 | * | 6/2008 | Heuermann et al. ........... 398/140 |

FOREIGN PATENT DOCUMENTS

| DE | 27 32 806 A1 | 1/1979 |
| DE | 28 46 526 | 5/1990 |
| DE | 195 02 989 A1 | 8/1996 |
| DE | 196 25 870 A1 | 1/1998 |
| DE | 44 21 616 A1 | 5/2001 |
| DE | 102 56 634 A1 | 12/2003 |
| EP | 0 908 030 B1 | 10/2003 |

OTHER PUBLICATIONS

German Office Action for DE 10 2008 022 217.8 with English translation.

* cited by examiner

*Primary Examiner* — Jessica Stultz
*Assistant Examiner* — Michael Carter
(74) *Attorney, Agent, or Firm* — Lempia Summerfield Katz LLC

(57) ABSTRACT

The present embodiments relate to non-contact transmission of optical signals by an optical waveguide which is provided with a material of which the electron arrangement is able to be put into population inversion. In a first variant, energy is fed to the optical waveguide so that the electron arrangement is held in a state above its thermal equilibrium and below the population inversion, with optical signals being beamed into the optical waveguide with a wavelength exciting the electrons of the inversion material such that a local population inversion is created in a section of the optical waveguide, and subsequently light which is created by spontaneous emission is detected. In a second variant, a local population inversion is created by pump light, with simultaneously optical signals being beamed into the population-inverted section with the emission wavelength and by light created by stimulated emission being detected. In a third variant, light with emission wavelength is beamed into the optical waveguide, the optical signals beamed in with excitation wavelength and the light created by stimulated emission detected.

19 Claims, 2 Drawing Sheets

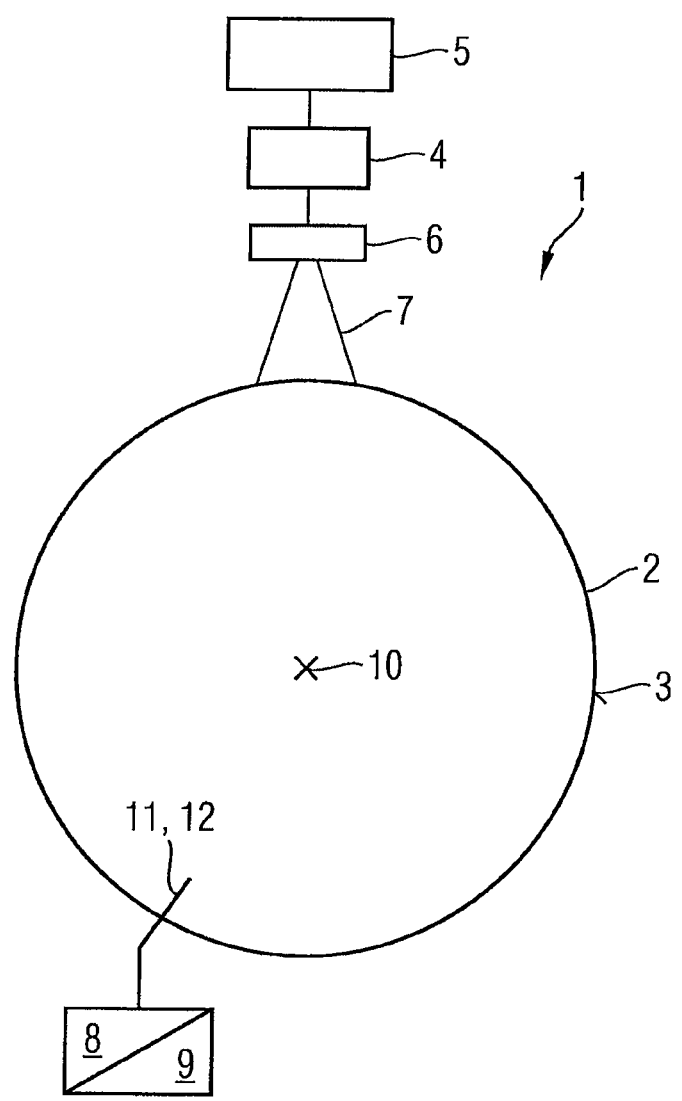

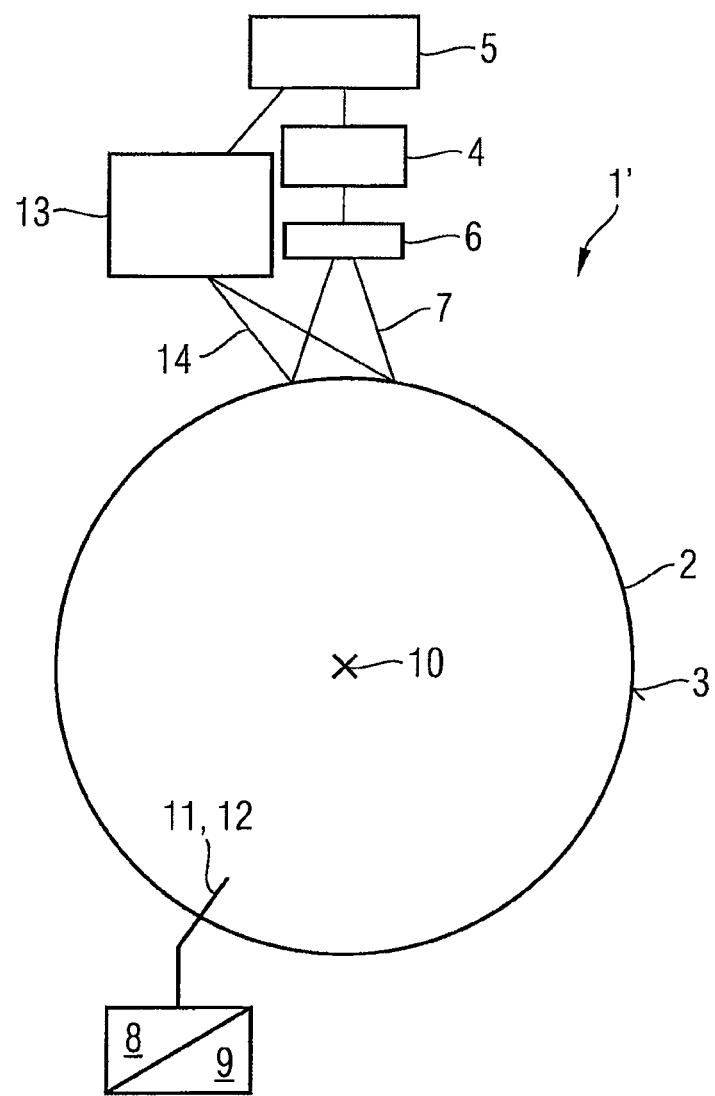

NON-CONTACT TRANSMISSION OF OPTICAL SIGNALS

The present patent documents claims the benefit of DE 10 2008 022 217.8 filed on May 6, 2008, which is hereby incorporated by reference.

BACKGROUND

The present embodiments relate to non-contact transmission of optical signals.

Electronic devices may include one fixed device component (stator) and one device component (rotor) able to be rotated around the stator, such as computer tomographs, for example. Data may be transmitted between the stator and rotor. Optical transmission methods provide high bandwidth, excellent electromagnetic compatibility and low interference. However non-contact transmission of optical signals between rotor and stator presents the developer with an enormous challenge, as the pertinent patent literature shows.

A number of methods have been described for direct lateral coupling of optical signals into a ring-shaped optical waveguide. For example, German application DE 2846526 discloses a computer tomograph in which a fixed annular optical waveguide is irradiated by a light source emitting the optical signals to be transmitted which is attached to a unit able to be rotated around the patient with x-ray tubes and detector. The light coupled laterally into the optical waveguide is directed using internal reflections to a light receiver (detector) and evaluated there. A direct coupling in of optical signals into an annular optical waveguide can for example also be taken from the German publications DE 2732806 and DE 10256634 A1. The disadvantage of direct coupling in of signals is primarily the associated heavy signal attenuation.

An improvement in the transmission quality can be obtained by optical waveguides acting as optical amplifiers and being provided for this purpose with a material able to be excited into fluorescence. The creation of fluorescent light in the optical waveguide is excited by the incidence of lateral optical signals which are directed by internal reflections to a detector device and evaluated there. The disadvantage is that the fluorescent light occurs through spontaneous emission so that the modulation bandwidth for the optical signals to be transmitted is greatly restricted by the lifetime of the fluorescence excitation states.

A wider modulation bandwidth for the optical signal transmission can be achieved by an optical amplifier, as is described in European patent EP 0908030 B1. This discloses an apparatus for receiving optical signals which comprises an optical waveguide bent into the shape of a ring, into which the optical signals are able to be coupled from the side. The optical waveguide is provided with a material of which the arrangement of electrons can be put into a population inversion by energetic excitation and which emits light with an emission wavelength by stimulated emission. If optical signals are coupled into the population-inverted optical waveguide, light is created by stimulated emission in the optical waveguide, which is directed by internal reflections to a detector device and can be evaluated there.

Although the modulation bandwidth and power for the optical signal transmission can be increased by this apparatus compared to an optical waveguide provided with fluorescing material, the primary problem arising is that of a strong spontaneous emission, which results in light continuously escaping from the optical waveguide. Another complicating factor is that light created by the spontaneous emission exhibits large amplitude fluctuations, with a characteristic time scale for the amplitude fluctuations depending on the amplification and able to lie in the range of the symbol length (period for transmission of a logical value). For this reason the spontaneous emission is viewed as a source of noise with significant amplitude, by which a sensitive optical signal transmission can be disturbed.

SUMMARY AND DESCRIPTION

The present embodiments may obviate one or more of the drawbacks or limitations inherent in the related art. For example, in one embodiment, a method for non-contact transmission of optical signals by an optical waveguide provided with material able to be put into a population inversion is provided. The method may be used to avoid a strong spontaneous emission with light of large amplitude fluctuations.

In a first embodiment, a method for non-contact transmission of optical signals is disclosed. As discussed in more detail below, the method includes exciting an electron arrangement, irradiating the optical waveguide, and detecting light created by an inversion material.

Excitation:

Energy is supplied into an optical waveguide, which is provided with al material of which an electron arrangement is able to be put into a population inversion and which can emit light by emission with an emission wavelength ($\lambda_2$). Energy is supplied in the manner that the electron arrangement of the material is held in an (energetic) state above its thermal equilibrium and below the population inversion. The excitation energy is fed to the optical waveguide, for example, by an optical (pump) light source which emits light with an excitation wave energy ($\lambda_1$) exciting the electrons.

Accordingly, the material able to be out into a population inversion (referred to below as "inversion material") has at least three energetic states for the electrons, for example, a ground state and two energetically higher-ranking excitation states (e.g., a first excitation state and a second excitation state). The electrons may, for example, by irradiation with light with excitation wavelength ($\lambda_1$), be put (pumped) from the ground state into the second excitation state. The electrons fall from the second excitation state back by radiationless energy output very quickly into the first excitation state where they remain for a long period.

If more (e.g., more than 50%) electrons are in an excited state than in the ground state, the energetic state of "population inversion" occurs for the electron arrangement of the inversion material. In the above example, the electrons may be excited when more than 50% of the electrons are in the first excitation state and less than 50% of the electrons are in the ground state of the electrons. For the energy threshold for population inversion (inversion threshold) there are just 50% of electrons in the excitation state and correspondingly 50% of the electrons in the ground state. Without the additional supply of external energy the population of excitation and ground states may be predetermined by the thermodynamic equilibrium which can be described by the Boltzmann equation.

First Irradiation:

Optical signals (light signals) may be beamed into the optical waveguide with a wavelength (excitation wavelength ($\lambda_1$) exciting the electrons of the inversion material such that a local population inversion is created in a local section of the optical waveguide. The optical signals may be coupled laterally into the optical waveguide. The optical signals may, for example, be beamed in at an angle between 0° and 90° relative to the irradiation surface of the optical waveguide, for example an optical fiber.

Detection:

Light (with emission wavelength ($\lambda_2$)) is detected and evaluated. The light may be created by the inversion material in the path of the local population inversion effected by the optical signals beamed into the optical waveguide through spontaneous emission and directed by internal reflections in the optical waveguide to a detector device.

As a result of the merely locally created population inversion in the inversion material the method makes possible an optical signal transmission with low background noise, so that the transmission quality can be significantly improved compared to the related art methods.

In a second embodiment, a method for receiving optical signals is provided. As discussed in more detail below, the method includes exciting an electron arrangement, irradiating the optical waveguide with a first irradiation, irradiating the optical waveguide with a second irradiation, and detecting light created by an inversion material.

Excitation:

In an optical waveguide, which is provided with an inversion material of which the electron arrangement is able to be put into a population inversion and which can emit light by emission with an emission wavelength ($\lambda 2$), energy is supplied in the manner in which the electron arrangement of the material is held in an (energetic) state above a thermal equilibrium and below the population inversion. The excitation energy is fed to the optical waveguide, for example, by an optical (pump) light source by light with an excitation wavelength ($\lambda_1$).

In regards to the characteristics of the inversion material, the reader is referred to the above-discussed method.

First Irradiation:

Light with a wavelength (excitation wavelength ($\lambda_1$) exciting the electrons of the inversion material is beamed in such that a local population inversion is created in a local (part) section of the optical waveguide.

Second Irradiation:

At the same time (and synchronized) to the first irradiation, optical signals are beamed into the section of the optical waveguide placed into a population inversion with the emission wavelength ($\lambda_2$) of the inversion material. The optical signals may be beamed laterally into the optical waveguide and may, for example, be beamed in at an angle of between 0° and 90° relative to an irradiation surface of the optical waveguide, for example, an optical fiber.

Detection:

Light (with emission wavelength ($\lambda_2$)) is detected and evaluated. The light is created by the inversion material in the path of the local population inversion effected by the optical signals beamed into the optical waveguide through spontaneous emission and directed in the optical waveguide by internal reflections to a detector device.

By contrast with the method of the first embodiment, as a result of the no longer stochastic creation process of the light in the optical waveguide, the background noises can be further reduced. In this case a deterministic signal is created of which the fluctuation is heavily reduced.

In the first irradiation, light with a wavelength exciting the electrons of the inversion material (excitation wavelength ($\lambda_1$) is beamed in at an angle of between 0° and 90° relative to an irradiation surface of the optical waveguide, for example, an optical fiber.

In an advantageous embodiment, in the second irradiation, light with a wavelength ($\lambda_1$) exciting the electrons of the inversion material is beamed in at one end of the optical waveguide, for example, an optical fiber. This enables an explicit routing of the light created by stimulated emission into that end of the optical waveguide from which the light with (excitation wavelength ($\lambda_1$) was coupled in.

In invention third embodiment, a method for receiving optical signals is provided. As discussed in more detail below, the method includes exciting an electron arrangement, irradiating the optical waveguide with a first irradiation, irradiating the optical waveguide with a second irradiation, and detecting light created by an inversion material.

Excitation:

Energy is fed into an optical waveguide which is provided with an inversion material of which the electron arrangement is able to be put into a population inversion and which can emit light by emission with an emission wavelength ($\lambda 2$), in such a manner that the electron arrangement of the material is held in an energetic state above its thermal equilibrium and below the population inversion. The excitation energy is fed to the optical waveguide, for example, by an optical (pump) light source which emits light with an excitation wave energy ($\lambda_1$) exciting the electrons.

With regards to the characteristics of the inversion material, the reader is referred to the discussion above in accordance with the first embodiment.

First Irradiation:

Light with the emission wavelength ($\lambda_1$) of the inversion material is beamed onto an end face of the optical waveguide, for example, an optical fiber.

Second Irradiation:

Optical signals (light signals) are beamed into the optical waveguide with a wavelength (excitation wavelength ($\lambda_1$) exciting the electrons of the inversion material such that a local population inversion is created in a section of the optical waveguide.

Detection:

Light (with emission wavelength ($\lambda_2$)) is detected and evaluated. The light may be created by the inversion material in the path of the local population inversion effected by the optical signals beamed into the optical waveguide through stimulated emission and directed by the optical waveguide by internal reflections to a detector device.

The method in accordance with the third embodiment has the advantage that for evaluation of the optically transmitted data, only an intensity difference of two very stable signal amplitudes must be evaluated.

In one embodiment, energy is fed to the optical waveguide in the excitation such that the electron arrangement is held in an energetic state of a maximum of 5% below the energy threshold for population inversion (inversion threshold). As a result, at least 45% of the electrons are in the excited state and a maximum of 55% of electrons in the ground state. This embodiment enables a simple and fast local population inversion of the inversion material by the optical signals with relatively low energy.

In another embodiment, energy is fed in the excitation to the optical waveguide such that the electron arrangement is held in an energetic state of a maximum of 1% below the energy threshold for population inversion. As a result, at least 49% of the electrons are in the excited state and a maximum of 51% of electrons in the ground state. This embodiment enables an especially simple and fast local population inversion of the inversion material by the optical signals with relatively low energy.

In accordance with a fourth embodiment, a suitable system for non-contact transmission of optical signals is provided for executing the method in accordance with the first embodiment. The system includes an optical waveguide which is provided with an inversion material of which the electron arrangement is able to be put into a population inversion and which can emit light by emission with an emission wavelength. The system may also include an excitation device through which the electron arrangement of the inversion material of the optical waveguide can be held in an energetic state above its thermal equilibrium and below the population inversion. The system includes an optical transmitter for beaming the optical signal into the optical waveguide with an excitation wavelength exciting the electrons of the inversion material, so that a local population inversion can be created in a section of the optical waveguide, as well as a detector device for detection of light that is created by the inversion material in the path of the local population inversion effected by the optical signal beamed into the optical waveguide through spontaneous emission.

In one variant, the system in accordance with the fourth embodiment is embodied so that the excitation device is additionally suitable for beaming in light with the emission wavelength into the optical waveguide. This makes the system in accordance with the fourth embodiment suitable for execution of the method in accordance with the third embodiment. For this purpose, the excitation device includes two different light sources, which can emit light with the excitation or emission wavelength, or a single light source which can emit light with the excitation or emission wavelength.

In accordance with a fifth embodiment, a system for non-contact transmission of optical signals for execution of the method in accordance with the second embodiment is provided. The system includes an optical waveguide which is provided with inversion material, of which the electron arrangement is able to be put into population inversion and which can emit light with an emission wavelength by emission. The system further includes an excitation device through which the electron arrangement of the inversion material of the optical waveguide can be held in an energetic state above its thermal equilibrium and below the population inversion. The system may include an optical pump source for beaming in light with an excitation wavelength exciting the electrons of the inversion material, so that a population inversion is created locally in one section of the optical waveguide, an optical transmitter for beaming in the optical signal into the population-inverted section of the optical waveguide with the emission wavelength of the inversion material. The system may include a detector device for detection of light that is created by the inversion material in the path of the optical signal beamed into the optical waveguide by stimulated emission.

In one embodiment, the optical waveguide is embodied in the form of an optical fiber, for example, a circular non-closed fiber in which the light created by emission propagates in the direction of the fiber axis.

In one embodiment, the optical transmitter may emit the optical signals to be attached to a first part and the optical waveguide as well as the detector device to be attached to a second part, with the first part and second part able to be moved relative to one another. The second part may involve a stator and the first part a rotor able to revolve around the stator, with the optical transmitter being arranged on the rotor so that the optical signal, on rotation of the rotor around the stator, can always be beamed into the optical waveguide. This enables optical rotary transmitters to be created which can be used to good effect in modern devices with rotating parts, such as computer tomographs.

BRIEF DESCRIPTION OF THE DRAWINGS

The invention will now be explained in more detail below on the basis of exemplary embodiments, with reference being made to the enclosed figures. Elements which are the same or operate in the same way are identified in the figures with same reference numbers.

FIG. 1 illustrates one embodiment of a system for non-contact transmission of optical signals; and FIG. 2 illustrates another embodiment of a system for non-contact transmission of optical signals.

DETAILED DESCRIPTION

FIG. 1 shows a system 1 for non-contact transmission of optical signals. The system 1 can, for example, be part of an x-ray diagnostic device for production of transversal layer images of a patient (computer tomograph).

The system 1 may include an optical waveguide in the form of a fiber ring 2. The fiber ring 2 can direct light through internal reflections between two surfaces along its fiber axis over the entire circumference of the ring. At an irradiation surface 3 of the fiber ring 2, optical signals 7 created by a first light source 4 can be beamed (coupled) laterally into the fiber ring 2 by optical components, such as lenses, collimators, diaphragms and the like, which are referred to overall as "optics" 6. Accordingly, the first light source 4 is connected to a modulator 5. The modulator 5 encodes the optical signals 7 in accordance with the data to be transmitted, for example, by pulse position modulation encoding (PPM).

The first light source 4 and the associated components are able to be rotated around an axis of rotation 10 that represents the center point of the fiber ring 2 and can beam optical signals into the latter around the entire circumference of the fiber ring 2. The fiber ring 2 remains immobile (stationary).

The fiber ring 2 is equipped with a small gap with two end faces, on each of which is arranged an optical detector 11 for detection of light created in the fiber ring 2. The optical signals converted by the detector 11 into electrical signals are demodulated in a demodulator 8 assigned to the detector 11 and can subsequently be fed into an evaluation unit.

The fiber ring 2 may include an optical waveguide material, for example, glass or plastic. The fiber ring 2 may be provided with an inversion material of which the electron arrangement can be put into a population inversion by energetic excitation. The fiber ring 2 may be "doped" with a rare earth element, for example, Erbium, in a suitable concentration. The electrons of the inversion material can be excited by excitation with light of an excitation wavelength ($\lambda_1$) and through spontaneous or stimulated emission subsequently emit light with an emission wavelength ($\lambda_2$), with the excitation wavelength being shorter than the emission wavelength ($\lambda_2 > \lambda_1$).

The inversion material of the fiber ring 2 may be excited (pumped) via a second light source 9. The second light source 9 may be able to beam in (couple in) light via a coupling-in line 12 with the excitation wavelength ($\lambda_1$) of the inversion material into the end faces of the fiber ring 2.

The electron arrangement of the inversion material of the fiber ring 2 may be held by beaming in light with the excitation wavelength ($\lambda_1$) by the second light source 9 permanently in an energetic state between the thermodynamic equilibrium and the population inversion. For example, light may be fed via the second light source 9 so that the electron arrangement is held at the most 1% below the energy threshold for population inversion. Accordingly, approximately 49% of the electrons of the inversion material are in an excited state and approximately 51% of the electrons are in the ground state.

The first light source 4 may be matched in relation to the wavelength of the emitted optical signals 7 to the inversion material. The optical signals 7 may be emitted with the excitation wavelength ($\lambda_1$) of the inversion material. The optical signals 7 are coupled, for example, at an angle of approximately 90° relative to an irradiation surface 3 of the fiber ring 2.

When optical signals 7 are coupled into the ring fiber 2, the energy introduced into the fiber ring 2 may selected to be large enough so that in the local (irradiated) section of the ring fiber 2 a local (locally limited) population inversion of the electron arrangement of the inversion material is created. As a result, light is created by spontaneous emission of the inversion material in the population-inverted section of the fiber ring 2. The created light may be guided through the fiber ring 2 to the detector 8, detected there, and subsequently processed. The length of a measurement light pulse created in the fiber ring 2 may depend on the length in the circumferential direction of the irradiated fiber ring section and the small signal amplification by the inversion material in the fiber ring 2.

The system 1 may enable a simple and relatively low-noise, non-contact transmission of optical signals between two components able to be rotated relative to one another.

In one embodiment, a method is provided for using the second light source 9 and pump light with the excitation wavelength ($\lambda_1$), through which the inversion material is excited to below the inversion threshold, additional light with the emission wavelength ($\lambda_2$), is beamed in (coupled in) equally via the coupling-in line 12 into an end face of the fiber ring 2. If optical signals 7 of the first light source 4 with the excitation wavelength ($\lambda_1$) are beamed into the fiber ring 2, a local population inversion is created in the irradiated section, so that through stimulated emission light with the emission wavelength ($\lambda_2$) is created which is guided by internal reflections to the detector 8. The method has the advantage that for evaluation of the optically transmitted data only one intensity difference of two very stable signal amplitudes is evaluated.

In FIG. 2 a further inventive system 1' for receiving optical signals is shown. To avoid unnecessary repetitions, only the differences from the system 1 shown in FIG. 1 are described and otherwise the reader is referred to the details of FIG. 1.

In the system 1' shown in FIG. 2 the optical signals 7 are coupled in by the first light source 4, not with the excitation wavelength ($\lambda_1$) of the electron arrangement of the inversion material, but with its emission wavelength ($\lambda_2$) into the fiber ring 2. Simultaneously and synchronized with this in the section of the ring fiber 2 irradiated with the optical signals 7, pump light 14 with the excitation wavelength ($\lambda_1$) of the inversion material is beamed in by a third light source coupled with the modulator 5, with the beamed-in energy being created so that a local population inversion is created in the irradiated section. As a result, a stimulated emission in the inversion material is triggered by the optical signals 7 (beamed in with emission wavelength ($\lambda_2$)), with light with emission wavelength ($\lambda_2$) being created in the fiber ring 2 which is guided through internal reflections to the detector 11 and can be processed.

Accordingly, a simple and especially low-noise, non-contact transmission of optical signals between two components able to be rotated relative to one another is provided.

In a first variant of the system 1' shown in FIG. 2, the section irradiated by the third light source 13 may be selected so that the section comprises one half of the fiber ring 2, so that the light pulse created in the fiber ring 2 by stimulated emission is guided explicitly onto a face surface of the fiber ring 2.

In a second variant of the system shown in FIG. 2, the third light source 13 may be combined with the second light source 9 or the two light sources can form a single light source in order to couple in both the light, through which the inversion material is excited to below the population inversion and the pump light for creating a local population inversion at an end face surface of the ring fiber 2.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for non-contact transmission of optical signals, the method comprising:
feeding energy into an optical waveguide that is provided with an inversion material, an electron arrangement of the inversion material operable to be put into population inversion, the inversion material, by emission, emitting light with an emission wavelength such that the electron arrangement is held in a state above a thermal equilibrium and below the population inversion;
beaming optical signals into the optical waveguide, the optical signals having a wavelength exciting the electron arrangement of the inversion material such that a local population inversion is created in a section of the optical waveguide; and
detecting light that is created by the local population inversion effected by the inversion material in a path of the optical signals beamed in through the optical waveguide by spontaneous emission.

2. The method as claimed in claim 1, wherein the energy is fed into the optical waveguide such that the electron arrangement is held in an energetic state of a maximum of 5% below an energy threshold for the population inversion.

3. The method as claimed in claim 1, wherein the energy is fed into the optical waveguide such that the electron arrangement is held in an energetic state of a maximum of 1% below an energy threshold for the population inversion.

4. The method as claimed in claim 1, wherein the energy is fed into the optical waveguide by a light source with light with the excitation wavelength.

5. The method as claimed in claim 1, wherein the optical signals are beamed in at an angle of between 0° and 90° relative to an irradiation surface of the optical waveguide.

6. The method of claim 1, wherein the electron arrangement is held in the state above the thermal equilibrium and below the population inversion until the optical signals are beamed into the optical waveguide.

7. A method for non-contact transmission of optical signals, the method comprising:
feeding energy into an optical waveguide that is provided with an inversion material, an electron arrangement of the inversion material operable to be put into population inversion, the inversion material, by emission, emitting light with an emission wavelength such that the electron arrangement is held in an energetic state above a thermal equilibrium and below the population inversion;
beaming in light with a wavelength exciting electrons of the inversion material such that a local population inversion is created in a section of the optical waveguide;
beaming optical signals into the population-inverted section of the optical waveguide with the emission wavelength at the same time as the beaming in light; and
detecting light that is created by the local population inversion effected by the inversion material in a path of the optical signals beamed in through the optical waveguide by stimulated emission.

8. The method as claimed in claim 7, wherein the light is beamed in at an angle of between 0° and 90° relative to an irradiation surface of the optical waveguide.

9. A method for non-contact transmission of optical signals, the method comprising:
feeding energy into an optical waveguide that is provided with an inversion material, an electron arrangement of the inversion material operable to be put into population inversion, the inversion material, by emission, emitting light with an emission wavelength such that the electron arrangement is held in an energetic state above a thermal equilibrium and below the population inversion;
beaming in light with the emission wavelength onto an end face of the optical waveguide;
beaming optical signals into the optical waveguide with a wavelength exciting the electron arrangement of the inversion material such that a local population inversion is created in a section of the optical waveguide; and
detecting light created by the local population inversion effected by the inversion material in a path of the optical signals beamed in through the optical waveguide by stimulated emission.

10. The method as claimed in claim 9, wherein the optical waveguide is an optical fiber.

11. A system for non-contact transmission of optical signals, the system comprising:
an optical waveguide having an inversion material, of which an electron arrangement is operable to be put into population inversion and which, by emission, is operable to emit light with an emission wavelength;
an excitation device that is configured to hold the electron arrangement of the inversion material of the optical waveguide in an energetic state above a thermal equilibrium and below the population inversion;
an optical transmitter operable to beam the optical signals into the optical waveguide with an excitation wavelength exciting the electron arrangement of the inversion material such that a local population inversion is created in a section of the optical waveguide; and
a detector device operable to detect light that is created by the local population inversion effected by the inversion material in a path of the optical signals beamed in through the optical waveguide by spontaneous emission.

12. The system as claimed in claim 11, wherein the excitation device is operable to beam in light with the emission wavelength into the optical waveguide.

13. The system as claimed in claim 11, wherein the optical transmitter is attached to a first part and the optical waveguide, and the detector device is attached to a second part, the first part and the second part operable to be moved relative to one another.

14. The system as claimed in claim 13, wherein the second part is a stator, and the first part is a rotor rotatable around the stator, the optical transmitter being arranged on the rotor such that the optical signals, on rotation of the rotor around the stator, are always operable to be beamed into the optical waveguide.

15. A system for non-contact transmission of optical signals, the system comprising:
an optical waveguide having an inversion material that is operable to put an electron arrangement into population inversion and, by emission, is operable to emit light with an emission wavelength;
an excitation device that is configured to hold the electron arrangement of the inversion material of the optical waveguide in an energetic state above a thermal equilibrium and below the population inversion;
a light source operable to beam in light with an excitation wavelength exciting the electron arrangement of the inversion material such that a population inversion is created locally in a section of the optical waveguide;
an optical transmitter operable to beam the optical signals into the population-inverted section of the optical waveguide with the emission wavelength; and
a detector device operable to detect light that is created by the inversion material in a path of the optical signals beamed into the optical waveguide by stimulated emission.

16. The system as claimed in claim 15, wherein the optical waveguide is an optical fiber.

17. The system as claimed in claim 16, wherein the optical fiber is a circular, non-closed fiber, in which the light created by emission propagates in a direction of a fiber axis.

18. The system as claimed in claim 15, wherein the optical transmitter is attached to a first part and the optical waveguide, and the detector device is attached to a second part, the first part and the second part operable to be moved relative to one another.

19. The system as claimed in claim 18, wherein the second part is a stator, and the first part is a rotor rotatable around the stator, the optical transmitter being arranged on the rotor such that the optical signals, on rotation of the rotor around the stator, are always operable to be beamed into the optical waveguide.

* * * * *